(12) United States Patent
Burla et al.

(10) Patent No.: US 11,397,838 B2
(45) Date of Patent: Jul. 26, 2022

(54) DROP TEST ANALYSIS AND OPTIMIZATION

(71) Applicant: Autodesk, Inc., San Rafael, CA (US)

(72) Inventors: Ravi Kumar Burla, Novi, MI (US); Jaesung Eom, Wexford, PA (US); Yuri Kizimovich, Westlake Village, CA (US)

(73) Assignee: AUTODESK, INC., San Rafael, CA (US)

( * ) Notice: Subject to any disclaimer, the term of this patent is extended or adjusted under 35 U.S.C. 154(b) by 1041 days.

(21) Appl. No.: 16/040,886

(22) Filed: Jul. 20, 2018

(65) Prior Publication Data

US 2020/0026808 A1   Jan. 23, 2020

(51) Int. Cl.
  *G06F 30/20*   (2020.01)
  *G06F 111/10*   (2020.01)

(52) U.S. Cl.
  CPC .......... *G06F 30/20* (2020.01); *G06F 2111/10* (2020.01)

(58) Field of Classification Search
  CPC .............................. G06F 30/20; G06F 2111/10
  USPC ............................................................. 703/2
  See application file for complete search history.

(56) References Cited

PUBLICATIONS

Drop Test Simulation of Cellular Phone, Master's Dissertation by Anders Harrysson, Division of Solid Mechanics, Lund University, Box 118, SE-221 00 Lund, Sweden, pp. 1-70, 2003 (Year: 2003).*
Impact Analysis of a Cellular Phone, Wei Liu and Hongyi Li, Beijing FEAonline Engineering Co.,Ltd. Beijing, China, 4th ANSA & μETA International Conference, pp. 1-7, 2011 (Year: 2011).*

* cited by examiner

*Primary Examiner* — Justin C Mikowski
(74) *Attorney, Agent, or Firm* — Gates & Cooper LLP

(57) ABSTRACT

A method, apparatus, and system provide the ability to perform a drop test using a response surface. Inputs including a target safety factor (T-SF), a drop height, and a computer model, are acquired. An initial template is evaluated by computing a safety factor for a set of orientations, for each model point MP in the computer model across a set of times (t). A minimum safety factor is determined and a response surface for the model is generated. An actual safety factor SFm is generated by conducting a drop test simulation of the model based on a point having the minimum safety factor and a corresponding orientation. Consistency/validity of the actual safety factor is compared to the target safety factor and the model either passes or additional points may be added to the set of points and the process repeats based on an updated response surface.

18 Claims, 11 Drawing Sheets

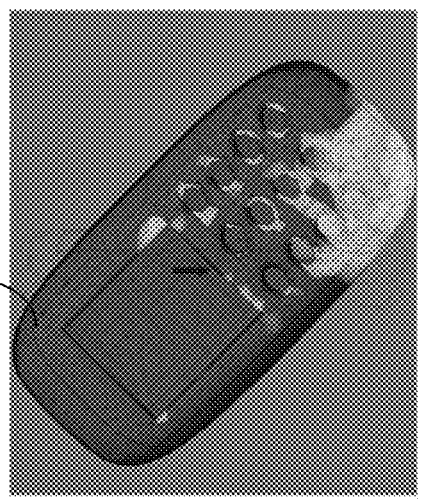
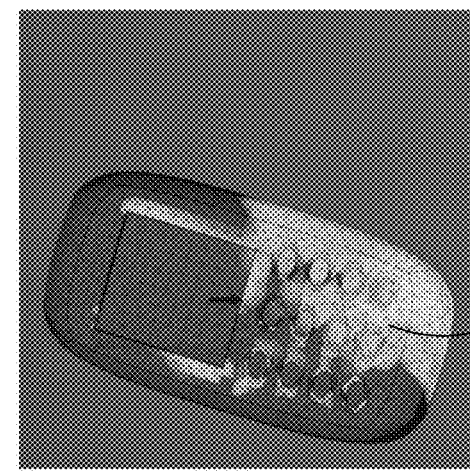
FIG. 11A
FIG. 11B

DROP TEST ANALYSIS AND OPTIMIZATION

BACKGROUND OF THE INVENTION

1. Field of the Invention

The present invention relates generally to computer-aided designs (CAD), and in particular, to a method, apparatus, system, and article of manufacture for analyzing and optimizing drop tests for objects dropped onto a floor from certain heights.

2. Description of the Related Art

Before physically manufacturing a product that has been designed using a computer-aided design (CAD) application, drop testing and impact testing may be used to assess the fragility of the product and simulate the shocks that the product may encounter. Typically, the design and testing are carried out by different "personas" or "users in sequence. The first user is a designer who is an expert in CAD and geometry creation, and has experience in designing components that have required functionality and are aesthetically pleasing. The second "persona" or "user" is an analyst/ engineer who is an expert in physics based simulation, CAE (computer-aided engineering), and FEA (finite element analysis), and is able to model the given CAD geometry as an FEA model and uses "experience" to assess which fall-orientations lead to failure in the component.

FIG. 1 illustrates the logical flow for designing/analyzing a product in the prior art. At step 102, a designer creates the CAD model.

At step 104, an analyst uses experience to validate the design by running a drop test FEA. The analyst runs a limited number of configurations in this step. In this regard, there may be thousands of different ways to orient an object/product and run a drop test. Each drop test includes numerous parameters as part of a complex setup.

At step 106, recommendations/failure information are provided to the designer on the validation and the process returns to step 102 where the designer makes appropriate changes to the design and the design cycle continues until both designer and analyst are satisfied. Such a process is time consuming, relies on multiple personas/users and is complex.

In view of the above, what is needed is a fast and accurate method to predict the worse-case scenario out of all possible orientations when any given object/product is dropped (e.g., onto a floor) from a certain height.

SUMMARY OF THE INVENTION

Embodiments of the invention overcome the prior art by providing a fast and accurate method to predict the worst-case scenario out of all possible orientations when any given object/product is dropped (e.g., onto the floor) from a certain height. Embodiments hide the complex setup (e.g., by pre-configuring the setup) for pre-processing, thereby reducing the need to know and understand the structural mechanics for post processing and interpretation of results. Such capabilities remove the barrier for simulation adoption. In addition, embodiments easily integrate the methodology into design tools (e.g., CAD engines such as the FUSION™ cloud based 3D CAD/CAM (computer aided modeling) tool, the INVENTOR™ mechanical design and 3D CAD software, etc.).

BRIEF DESCRIPTION OF THE DRAWINGS

Referring now to the drawings in which like reference numbers represent corresponding parts throughout:

FIGS. 11A-11B illustrate the evolution of response surfaces in accordance with one or more embodiments of the invention;

DETAILED DESCRIPTION OF THE PREFERRED EMBODIMENTS

Figure 1:
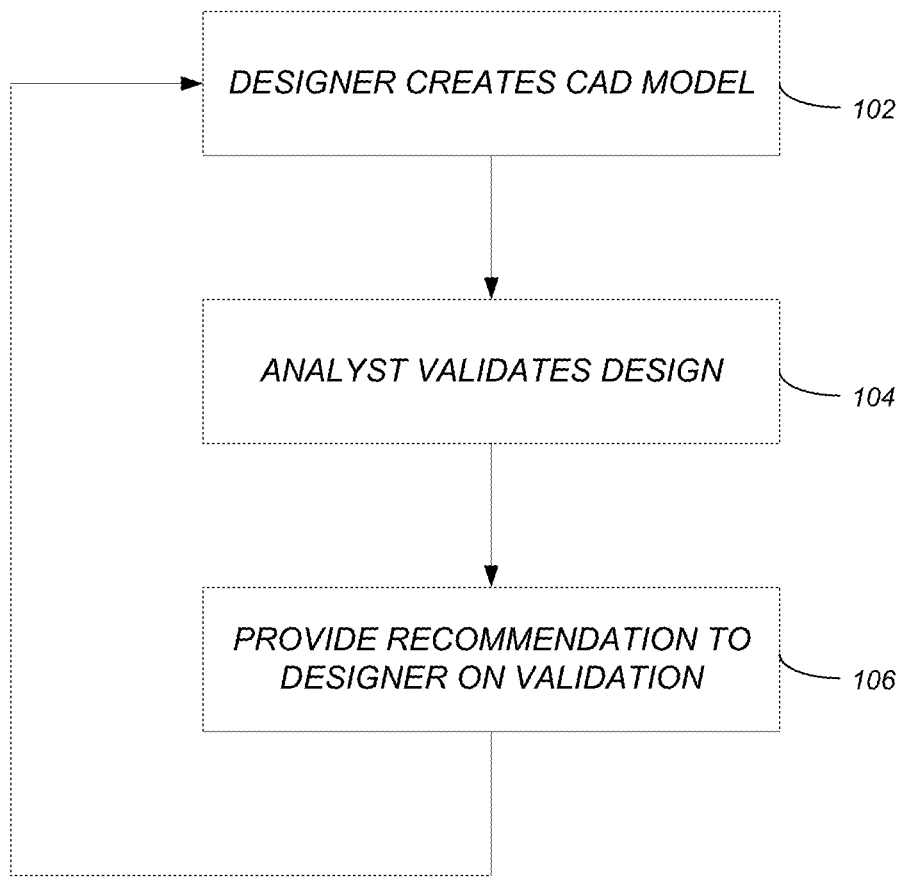
FIG. 1 illustrates the logical flow for designing/analyzing a product in the prior art.

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

As described above, prior art techniques failed to provide an automated way for identifying the "worst case scenario" for a drop test scenario. The analyses and the orientation of the dropping object/model was determined by the "experience of the engineer/designer". Using such prior art techniques, it was not always possible to identify the worst case scenario from mere experience. Further, when creating new CAD models for a specific application, there may not be "previous experience" models available as the new shape of the CAD model may not have been previously designed or thought of.

Understanding the failure behavior of objects that typically drop-on-the-floor is an important in the design of electronic components such as cell-phones, cameras, etc. Embodiments of the invention provide one or more of the following advantages to a designer:

(1) Enables designer to create safe models that don't break and that are prone to drops in daily/typical usage (e.g., consumer electronics).

(2) Reduces the design cycle steps by making the simulation an integral part of the design process.

(3) Simulation is built into the design cycle without the designer having to know about the details of the problem setup or the physics of the problem.

(4) Enables the "non-expert" user to perform nonlinear transient FEA analysis, without having to understand the details of FEA.

Configuration

Prerequisites

Embodiments of the invention may utilize/have various prerequisites that are used to predict the worst drop test scenario. A first prerequisite is a drop test solver is utilized. A drop test solver runs/executes an analysis with given parameters (e.g., model orientation [e.g., with respect to a floor], drop height, parameters with respect to model properties, etc.) and outputs a safety factor contour on an entire model. In this regard, a solver may be developed based on a co-rotational framework but other techniques may be utilized. For example, an impact analysis engine such as that in AUTODESK™ NASTRAN™'s stress analysis software, and explicit solver such as AUTODESK™ EXPLICIT™ analysis/solver software), customized drop test solvers, etc. may be utilized in accordance with embodiments of the invention.

Optimization Problem

An overall function of embodiments of the invention is to efficiently and quickly determine the minimum safety factor for a given design/model. In this regard, based on the different orientations and drop tests, many different safety factors are determined. Once a model has a safety factor that is beneath a minimum threshold value, the model fails a drop test and a redesign/modification to the design is likely recommended. Accordingly, the minimum safety factor across all simulations/drop tests needs to be determined in an optimal manner.

In view of the above an objection minimum safety factor function is evaluated based on various design parameters (model, floor orientations, etc.). User inputs may include a target/threshold safety factor and a drop height). Auxiliary conditions may also be evaluated (e.g., whether a safety factor>target/threshold value). If the auxiliary condition fails (i.e., the determined safety is lower than [e.g., or equal to] the target/threshold safety factor value), a failure of the model may be reported.

Design Space—Floor and Gravity Orientation

Optimize the analysis/computations, embodiments of the invention attempt to reduce the number of parameters that are used thereby reducing the number of computations while simultaneously improving the quality of identified solutions.

In this regard, for the design parameters, the gravity direction and drop height may be specified/input/utilized as parameters. In particular, six (6) parameters may be specified in the design space that includes the floor and model orientations (e.g., in three (3) dimensions—($x_{floor}$, $y_{floor}$, $z_{floor}$) and ($x_{model}$, $y_{model}$, $z_{model}$)).

One may note that the orientation of the gravity field with respect to the floor can affect the damage that is incurred. In this regard, if gravity and the floor are not aligned perpendicularly/orthogonally (i.e., at an angle other than orthogonally with respect to each other), less damage to the object/model will be incurred. Since it is desirable to determine the maximum damage to an object (i.e., thereby resulting in the minimum safety factor for the object/model), embodiments of the invention align the floor normal with the gravity field, and remove alternative configurations from the analysis (thereby optimizing the maximum damage determination).

Figure 2A:
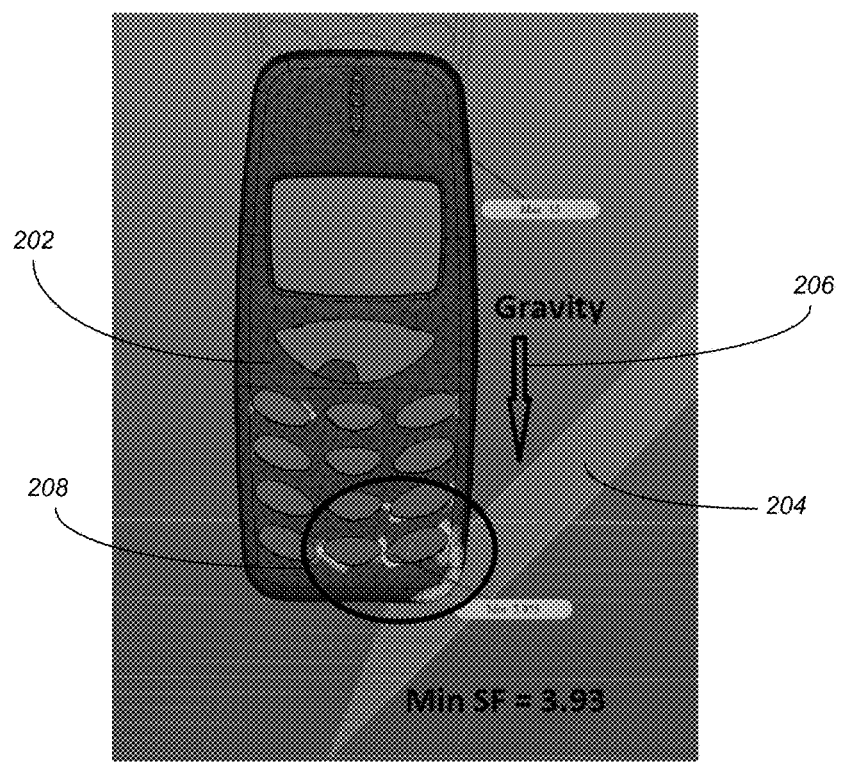
FIG. 2A illustrates a model, floor, and a gravity field in which the floor normal and gravity field are not aligned in accordance with one or more embodiments of the invention.
Figure 2B:
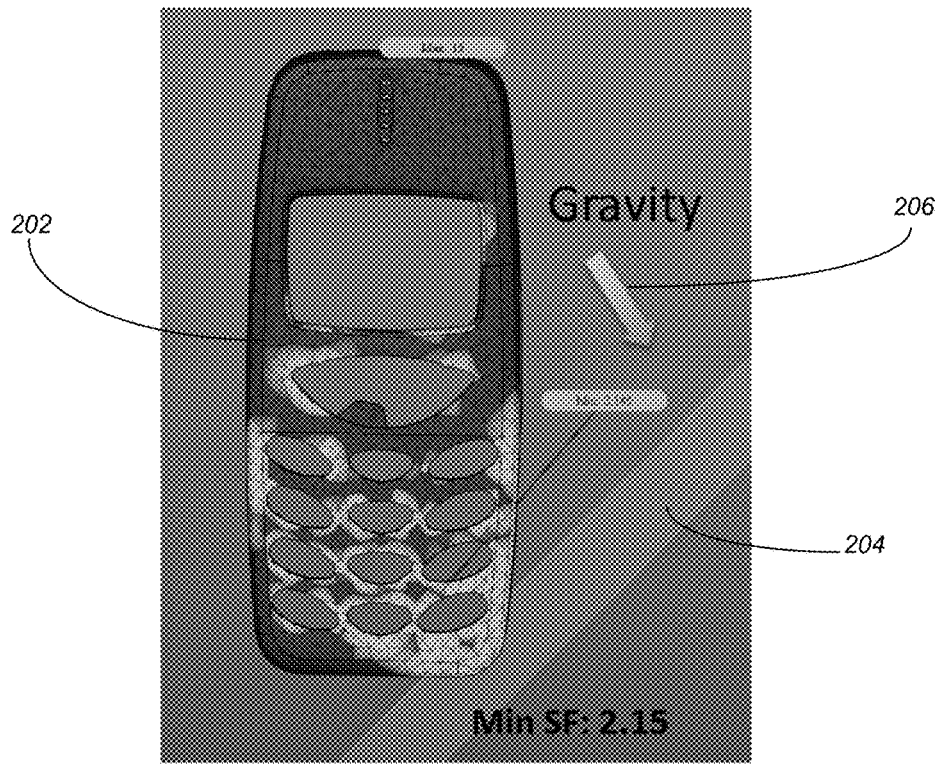
FIG. 2B illustrates an alignment of the floor normal with respect to the gravity field in accordance with one or more embodiments of the invention.

FIG. 2A illustrates a model 202, floor 204, and a gravity field 206 in which the floor 204 normal and gravity field 206 are not aligned. As can be seen only a small portion 208 of the model incurs damage. FIG. 2A may be contrasted with FIG. 2B which shows the alignment of the floor 204 normal with respect to the gravity field 206. As illustrated in FIG. 2B, more damage (i.e., to the object/product 202 as illustrated by the highlighted areas) results when the floor 204 normal and gravity 206 are aligned (i.e., the floor and gravity are in the same direction). By aligning the floor 204 normal and gravity field 206, the design space may be reduced to three (3) parameters (i.e., the parameters corresponding to the floor orientation are not needed).

Design Space—Model Orientation

Figure 3:
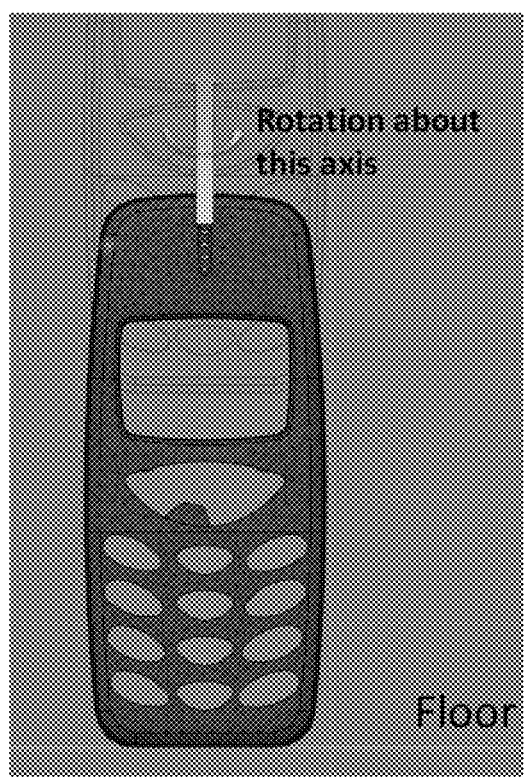
FIG. 3 illustrates a model rotation about an axis with respect to a floor in accordance with one or more embodiments of the invention.

In addition to gravity and the floor, the other design factor is the orientation of the model/object/product (i.e., ($x_{model}$, $y_{model}$, $z_{model}$). To define such an orientation, three (3) independent angles/axis are needed. FIG. 3 illustrates a model rotation about an axis with respect to a floor in accordance with one or more embodiments of the invention. As illustrated, all configurations with rotation about the axis shown are the same (i.e., with respect to the floor, the axis of rotation is irrelevant because the model will drop to the floor in a symmetrical manner). Accordingly, with a symmetrical object, the design space may be reduced to two (2) parameters (e.g., using spherical parametrization) ($x_{model}$, $y_{model}$). Alternatively, the design space may also be represented as ($x_{model}(\phi,\theta)$, $y_{model}(\phi,\theta)$, $z_{model}(\phi,\theta)$, where each of x, y and z are functions of independent parameters $\phi$ and $\theta$.

Design Space—Geometrical Interpretation

When one examines a 2D space in the plane of a screen, a model (e.g., a cellular phone) may be thought of as an image problem. The object/model may be hitting the floor, or the object/model is constant and the floor is hitting the object/model.

Figure 4:
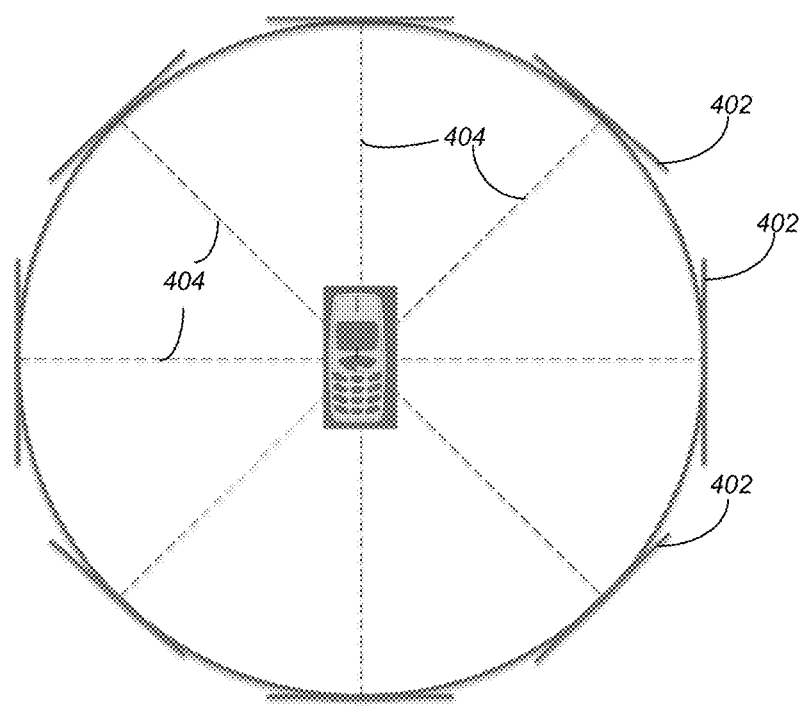
FIG. 4 illustrates a geometrical interpretation of an object/ model from a model's point of view in 2D in accordance with one or more embodiments of the invention.

FIG. 4 illustrates a geometrical interpretation of an object/model from a model's point of view in 2D in accordance with one or more embodiments of the invention. When the floor is hitting the object/model, all floors that hit the object/model are tangents to the object/model that is centered at the center of the object/model and has a drop height. In other words, all possible floors are tangents 402 to a circle/sphere of a radius 404 that equals the drop height. In such an image, the radial direction is equivalent/equal to the floor normal. The model orientation is represented by the surface of a sphere. With a sphere (i.e., in 3D), there are two (2) degrees of freedom (DOF). However, in 2D (as illustrated in FIG. 4), there is only one DOF (i.e., the angle from the normal of the tangent plane 402 to the x-axis).

Figure 5:
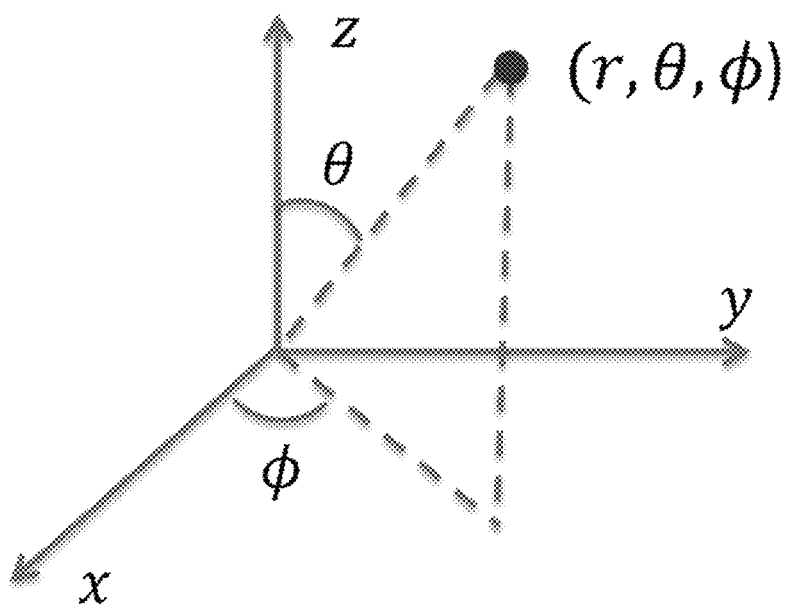
FIG. 5 illustrates a spherical parameterization using ($\phi, \theta$) in accordance with one or more embodiments of the invention.
Figure 6:
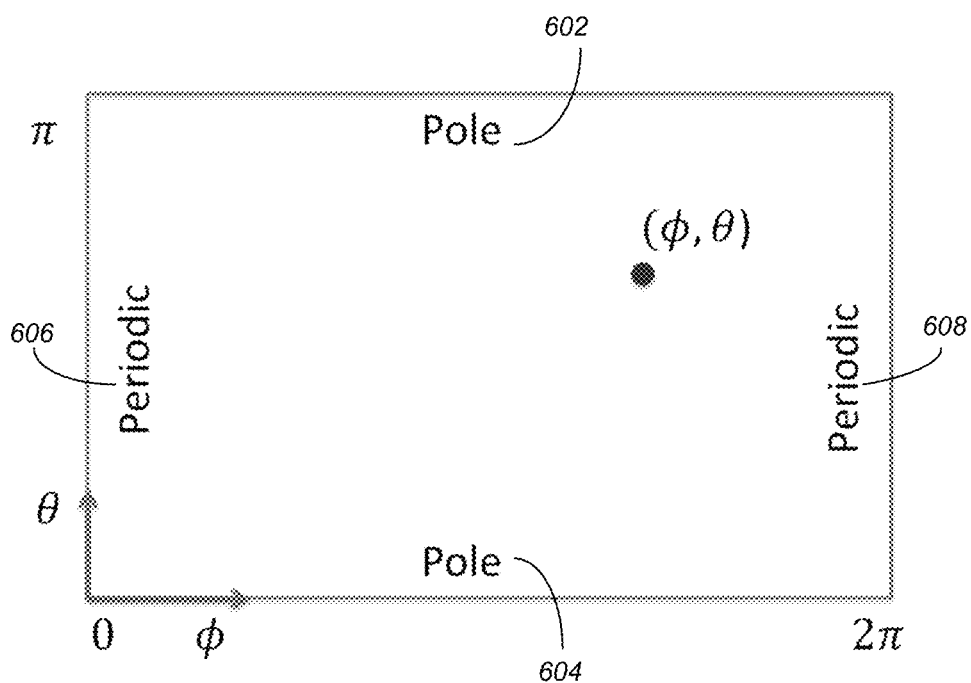
FIG. 6 illustrates an exemplary image of a 2D parameterization of a sphere in accordance with one or more embodiments of the invention.

Consistent with FIG. 4, parametric space can be viewed as a surface of a sphere with the center of the sphere as the centroid of the object/model, and the radius as the drop height. All floors can be defined as tangents to the sphere and rotations can be based on such parameters. FIG. 5 illustrates the spherical parameterization using ($\phi$,$\theta$) in accordance with one or more embodiments of the invention. FIG. 5 illustrates the conceptual image of the surface of a sphere that is mapped to a 2D image (i.e., based on a spherical parametrization) in accordance with one or more embodiments of the invention. In this regard, if one opens up a sphere like a globe on a 2D map, the image in FIG. 6 results. There is only one evaluation needed at each pole 502. Further, there is periodicity at $\phi$=0 and $2\pi$. Accordingly, only one evaluation is needed at either 0 or $2\pi$. In FIG. 6, the top and bottom of the 2D map represent the poles 602 of the sphere. Similarly, due to the periodicity (reflected in FIG. 5), if there is some value on the left side 606, that value is repeated on the right side 608. Such a parameterization minimizes the number of evaluates needed and improves the validity of the surfaces that are being generated.

Drop Test Technical Analysis

As described above, one or more drop tests are performed. In one or more embodiments, the following equation of motion may be utilized:

$$M\ddot{x}(t)+C\dot{x}(t)=f_{gr}-f_{int}$$

where M is the system mass and C is the system damping. Damping is present in all structural models. Damping is responsible for dissipation of energy in a system. x(t) represents the position at time t of the all model points in the model (finite element mesh nodes) as a function of time in the system. Since, the position of the model changes with time, it is a function of time. $\dot{x}$(t) represents the velocity at time t of all model points MP in the model $\ddot{x}$(t) represents the acceleration at time t of all model points MP in the model. The right hand side of the equation represents the forces acting on the system: $f_{gr}$ is the force due to gravity and $f_{int}$ is the internal forces in the system.

Initial conditions for drop test include v(0)=$v_0$ and x(0)=$x_0$ with boundary conditions of $v_\Gamma$: (v, n)$_\Gamma$=0 where $\Gamma$ represents the boundary of the model and $v_\Gamma$ is the normal velocity on the boundary. This is computed as a dot product of velocity of the nodes on the boundary with the surface normal at that point.

Further, implicit time integration (that is estimated using materials and geometry and adapted using stress history) may be performed. Such implicit time integration may be unconditionally stable and enables a larger integration time step size. A co-rotational formulation may also be used to perform the drop test. Such a co-rotational formulation separates rigid and elastic deformations, efficiently computes stiffness matrices and internal forces, and evaluates strain and stress after removing rigid rotations.

The parameters used to conduct the drop tests may also automated. For example, the collision with the floor may be based on a floor point and normal from the floor using a rigid body solver. In addition, the cyclical performance of drop tests and evaluations may be stopped based on a stress and collision history. In this regard, traditionally, the user specifies the time duration parameter for which the drop test needs to be performed. However, this parameter can be automated based on the stress behavior and collision history. This is possible because as the drop test (collision of the model with the floor) progresses, the energy in the system gets dissipated and as the energy reduces, the subsequent impacts with the floor will lead to lower damage when compared to the initial impacts. The evaluations are stopped once it is determined that the subsequent impacts lead to negligible stress (when compared to the initial impact) in the model.

Response Surface Based Optimization

Figure 7:
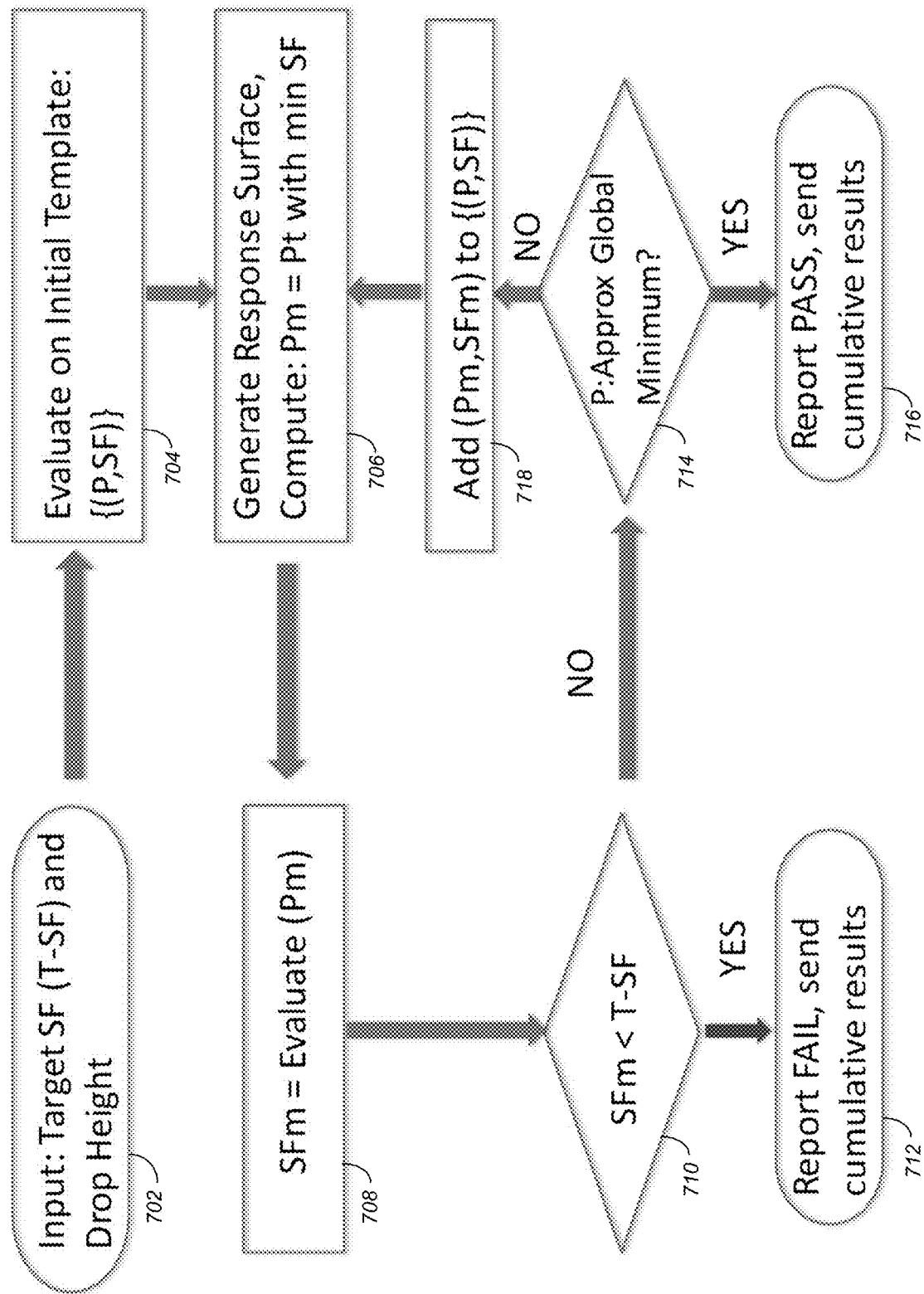
FIG. 7 illustrates the logical flow for performing a response surface optimization in accordance with one or more embodiments of the invention.

FIG. 7 illustrates the logical flow for performing a response surface optimization in accordance with one or more embodiments of the invention.

At 702, inputs are acquired. The inputs include the target SF (safety factor) (referred to as T-SF), the drop height (i.e., the height that the model/object/product will be dropped from) and a computer model (that includes model points MP). The T-SF identifies a numeric or other threshold value representing the minimum acceptable SF for the model/object/product. Further inputs may include the model geometry (e.g., CAD, meshed, STL, a part or an assembly model, etc.), material properties of the model, and/or the type of floor (e.g., rigid floor [concrete, marble, etc.], soft floor [carpet, padded with "flexible" material such as foam, rubber, etc.]).

At step 704, an evaluation is performed on an initial template across the domain of {(P,SF)}. P represents a point in design/parameteric space and the evaluation determines a valid behavior across the points of the entire model/object/product. The initial template consists of a set of points P in parametric space, and the set of points P corresponds to a set of orientations. More specifically, each point P in the set of points in the parametric space corresponds to an orientation of the model in the physical space. The evaluating computes a safety factor at each orientation (in the set of orientations) for each model point MP in the computer model across a set of times (t) (e.g., all times). For each model point MP, a minimum safety factor is determined from the computed safety factors across the set of times (t) (this is the minimum safety factor over the entire model due to the impact with the floor at the given orientation corresponding to P).

In this regard, step 704 computes the minimum safety factor for each point in the model/object/product. As a result, step 704 provides/produces a list of orientations and safety factors corresponding to each point (or a set of points). In particular, at step 704, a predetermined list of orientations are selected upon which to run the drop test (e.g., orient the model at 90 degrees from the floor and various other angles). As described with respect to FIG. 6, such orientations may include a point on a periodic line, another on the pole, and others on some random points to provide a better/improved estimate of the surface.

At step 706, a response surface (for the entire model) is generated in parametric space (based on the determined minimum safety factors). As described above, such a response surface passes through the points P (in the parametric space) and is based on the determined minimum safety factors. Further, step 706 also includes (e.g., as part of the generating) computing a point Pm (in the parametric space) that corresponds to the minimum safety factor in the response surface (wherein the point Pm has a corresponding orientation). In this regard, the point Pm is computed as the point (Pt) where the safety factor (SF) is estimated to be the minimum (i.e., where the maximum damage results). Thus, the point Pm is an estimation of a point in the parametric space that is estimated to correspond to a global minimum.

At step 708, an actual safety factor (at the estimated global minimum orientation) (SFm) is generated. This generation includes evaluating the point Pm by conducting a drop test simulation of the model (based on the point Pm's corresponding orientation) and the drop height (i.e., SFm=Evaluate (Pm)). In this regard, the evaluation includes running a drop test simulation at the point (Pm). Stated in other terms, in parametric space, each point corresponds to an orientation in the physical space and the minimum (Pm) corresponds to the orientation that leads to a minimum safety factor (i.e., the orientation that will cause the maximum damage). Accordingly, once a response surface is generated at step 706 (that includes computing the point Pm (and corresponding orientation) where the safety factor is at a minimum), a drop test simulation is performed at the orientation corresponding to point Pm. The typical workflow for performing a drop test includes creating/importing a model, setting material properties and mesh settings, defining the floor, gravity, and model orientation, and solving/performing the drop test based thereon.

At step 710, a determination is made regarding whether the actual safety factor SF at the estimated global minimum orientation point Pm (i.e., SFm) is less than the target SF (i.e., is the computed actual safety factor less than the target safety factor or greater than the target safety factor). In other words, step 710 determines whether the actual safety factor at the estimated global minimum orientation point Pm (i.e., SFm) is consistent with the target safety factor T-SF.

At step 712, if the actual safety factor SFm is less than the target safety factor T-SF, then it may be concluded that the orientation leads to the failure of the model/drop test and the designer is informed of such a failure (i.e., safety factor results are accumulated and provided/sent to the designer so that the designer can determine the problem and adjust the design as necessary) (i.e., the corresponding orientation is provided to the designer/user).

At step 714, if the actual safety factor SFm is consistent with the target safety factor T-SF (e.g., the computed actual safety factor at point Pm is greater than or equal to the target safety factor), a determination is made regarding whether the actual safety factor SFm is valid. In this regard, an approximate global minimum is determined/found/computed and a determination is made if the computed actual safety factor SFm is the approximate global minimum (i.e., across the entire model) or not. The goal is to identify if there exists an orientation of the model that would violate the minimum safety factor provided by the user. It can be observed that such an orientation will have the minimum safety factor over all possible orientations. So, embodiments of the invention are trying to minimize the safety factor and in doing so, will determine the orientation that may lead to a violation of the safety factor (e.g., a threshold set by the user). The minimum safety factor is basically the global minimum in the parametric space. Since, an iterative approach is utilized to find the minimum safety factor and also identify such a value based on sampling on a discrete grid in the parametric space, an approximate global minimum is determined/acquired. Embodiments of the invention determine/confirm that the actual global minimum has been reached when subsequent iterations do not find any new points in the parametric space that are lower than the already identified minimum safety factor.

At step 716, if the actual safety factor SFm (at the estimated global minimum orientation) is valid (e.g., it is an approximate global minimum as determined at step 714) and the safety factor is consistent with the target safety factor T-SF (i.e., as determined at step 710), then the model has not failed the drop tests, results are accumulated and a passing event is reported to the designer/user.

At step 718, if the point P is invalid (e.g., it is not a global minimum), the point (Pm, SFm) that was just generated is added to the space {(P,SF)} and the point is used to generate a new response surface at step 706 and the process repeats. In other words, based on the various computations/determinations, orientations are adaptively added to the orientation list and the cycle continues in a manner that optimizes the computation of the minimum safety factor across the model.

Figure 8A:
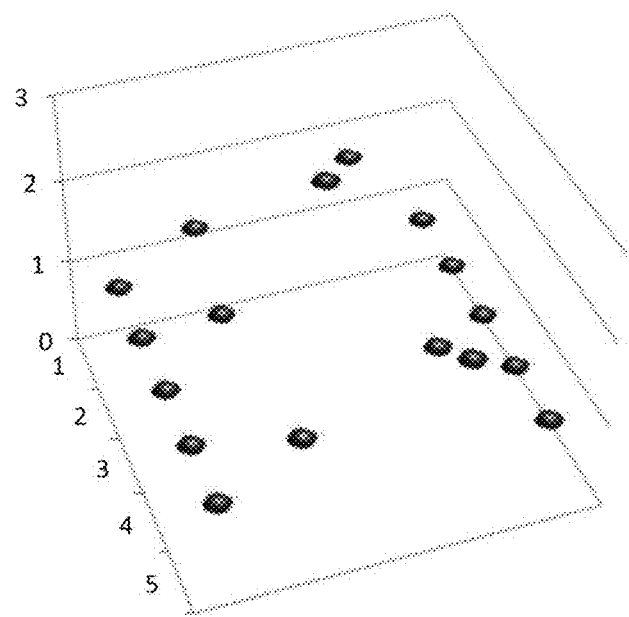
FIGS. 8A and 8B illustrate the details for the construction/ generation of a response surface in accordance with one or more embodiments of the invention.
Figure 8B:
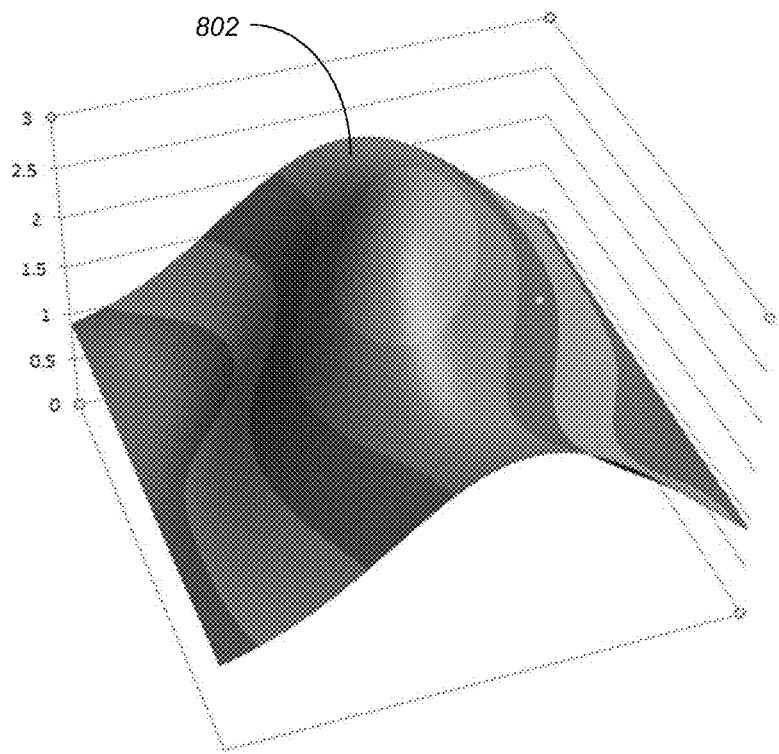

Expanding on the above, FIGS. 8A and 8B illustrate the details for the construction/generation of a response surface in step 706 in accordance with one or more embodiments of the invention. In FIG. 8A, points in n-dimensional space are retrieved and a surface that passes through the points is constructed. FIG. 8B illustrates the results of such a response surface. Radial basis functions may be used to construct the response surface. For example, the following radial basis function may be utilized:

$$f(x) = \Sigma w_i \Phi(|x - x_i|)$$

where the function $f(x)$ is dependent on radial "distance" and may be extendable to n-dimensions. $x_i$ reflects points with known values and x consists of any point. The kernels for $f(x)$ may include one or more of the following:

Gaussian: $\Phi(r) = e^{-(\epsilon r)^2}$

Multiquadric $\Phi(r) = \sqrt{\epsilon^2 + r^2}$

Inverse Multiquadric $\Phi(r) = \dfrac{1}{\sqrt{\epsilon^2 + r^2}}$

As an example in generating the response surface, if there are three (3) points, the radial basis function would compute a continuous surface through/that contains the points where x is a coordinate of the point in N-dimensions. For example, if one is considering two dimensional space (2D-plane), then N is 2, and if considering a three dimensional space (3D-space), then N is 3 and so on. $\Phi$ represents the radial basis kernel function of any given point $x_i$. Three different surfaces may be constructed (Gaussian, multiquadric, and inverse multiquadric). At any given point between two points, $\Phi$ determines how the function is computed and $w_i$ is the weight corresponding to each point $x_i$. If one desires to compute the value of y at any given x, the sum of $w_i * \Phi$ is computed. The epsilon value $\in$ controls the amount of influence the radial basis provides based on the point distribution.

Figure 9:
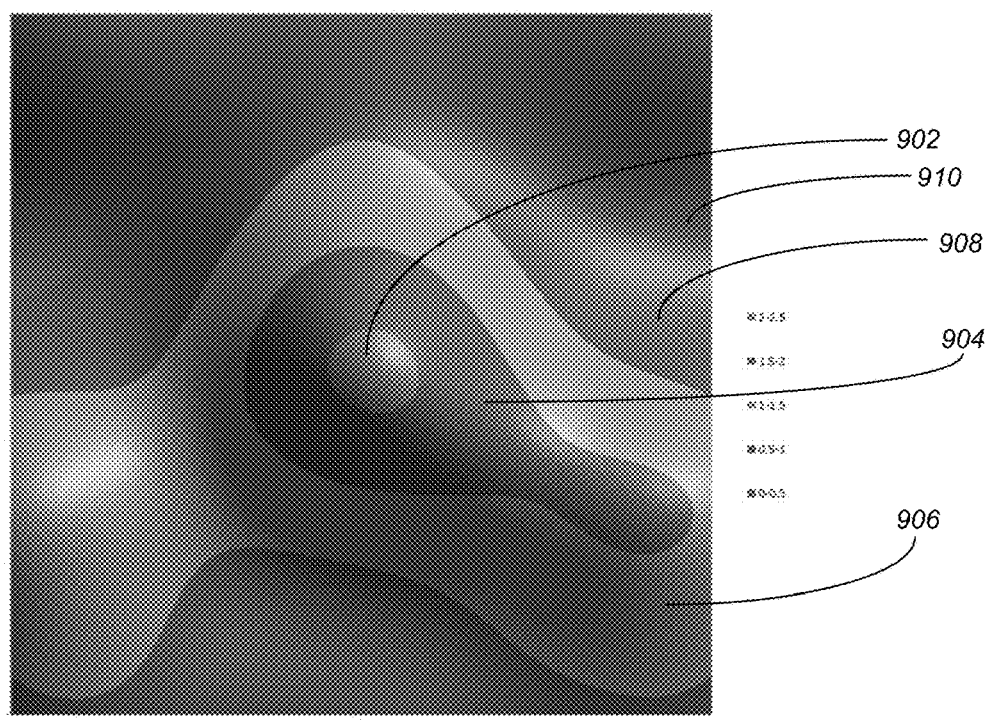
FIG. 9 illustrates an exemplary response surface for which a global minimum may be computed in accordance with one or more embodiments of the invention.

FIG. 9 illustrates an exemplary response surface for which a global minimum may be computed in accordance with one or more embodiments of the invention. Many methodologies may be used to compute a global minimum and or to optimize the process described herein. An overlay grid may be constructed with an optional selection of the grid density. The grid density may be used to determine the accuracy of any computations. Once constructed, the different colors/shading reflect the different ranges of safety factor values on the response surface. For example, area 902 reflects safety factor values in the range of 2-2.5, area 904 of the range 1.5-2, area 906 of the range 1-1.5, area 908 of the range 0.5-1, and area 910 of the range 0-0.5. For example, to maximize the accuracy, a very fine grid may be utilized but results in an increased computational cost (i.e., for computing values at each grid point). Values at each grid point are computed and the grid point with the lowest/minimum value is determined.

Exemplary Use Case

Figure 10:
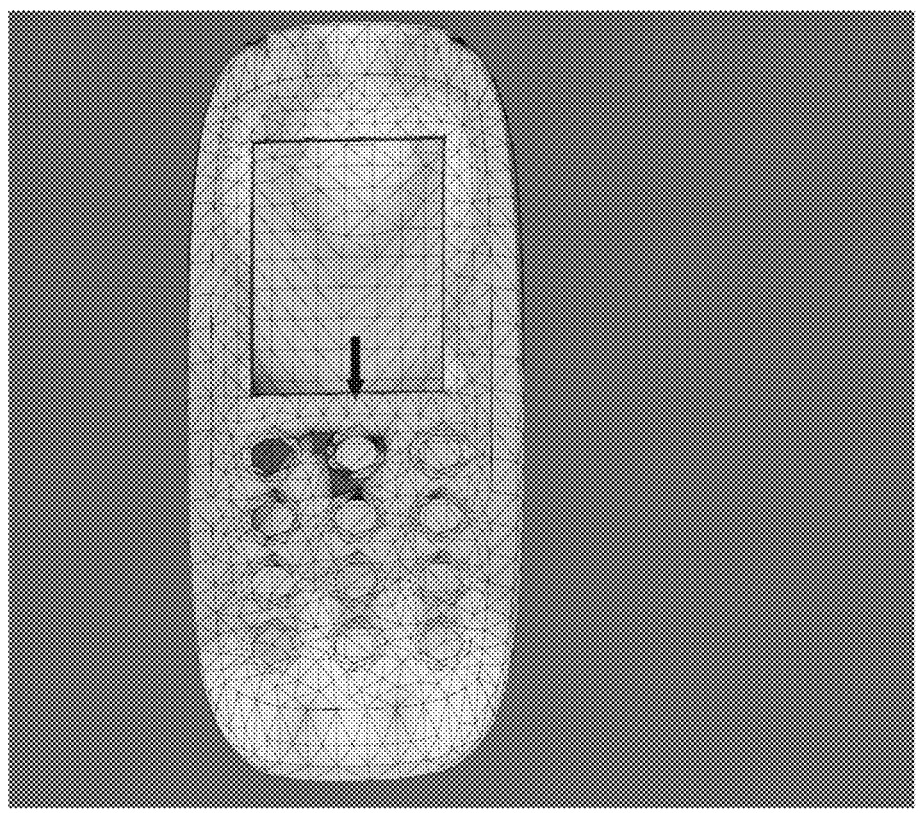
FIG. 10 illustrates an exemplary use case of a cellular phone model in accordance with one or more embodiments of the invention.

FIG. 10 illustrates an exemplary use case of a cellular phone model in accordance with one or more embodiments of the invention. The drop height was 0.25 m and the target safety factor was 1.50. As shown, the solution displayed in FIG. 10 reflects that the model has passed with a minimum safety factor of 1.63 and ten (10) evaluations were completed. If/when the image is displayed in color, different colors may reflect different safety factor computations and any areas displayed in red would reflect a failure to meet the minimum safety factor. In this regard, for the ten (10) different orientations for which evaluations were conducted, the minimum safety factors across the different orientations are plotted to produce/output the image of FIG. 10.

FIGS. 11A-11B illustrate the evolution of response surfaces in accordance with one or more embodiments of the invention. Referring to FIG. 11A, the process begins with a template consisting of three points/orientations 1102. Four (4) points/orientations 1104 are added on the top and bottom based on the poles as reflected in FIG. 6. The minimum safety factor for each point/orientation 1102 and 1104 is computed and plotted to generate the response surface 1106A.

Upon an analysis of the response surface 1106A, the area with the lowest/minimum safety factor may be determined (e.g., area 1108) and utilized to conduct a drop test analysis. Image 1110A reflects the resulting behavior on the model itself based on the drop tests conducted. As a result of the evaluation/drop tests conducted in FIG. 11A, additional points/orientations may be added to the design space as reflected in FIG. 11B (i.e., points 1112). Thereafter, the response surface 1106B is regenerated and the drop tests are rerun to produce/output image 1110B.

Figure 12A:
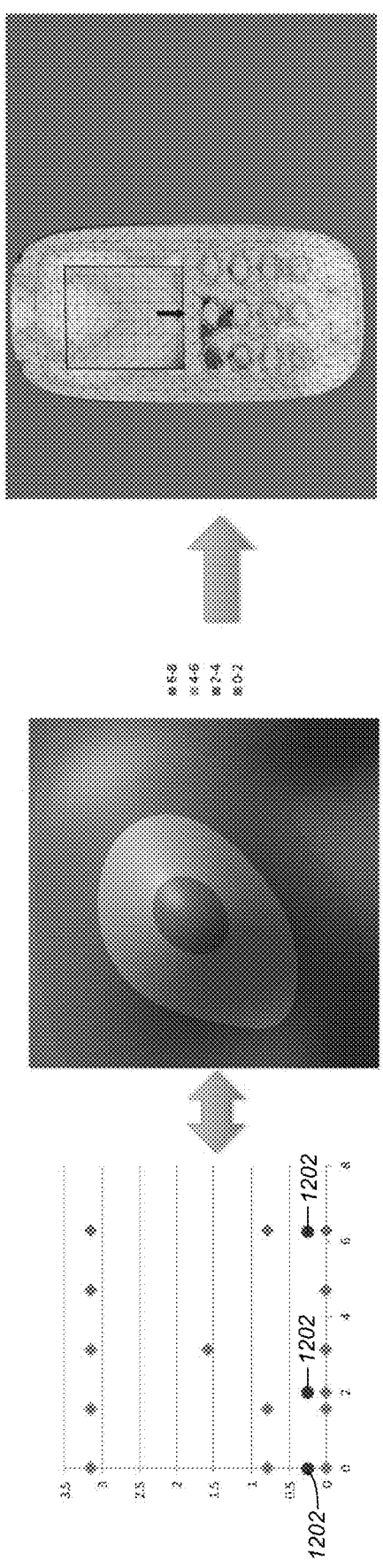
FIGS. 12A and 12B illustrate an additional exemplary evolution of the response surface in accordance with one or more embodiments of the invention.
Figure 12B:
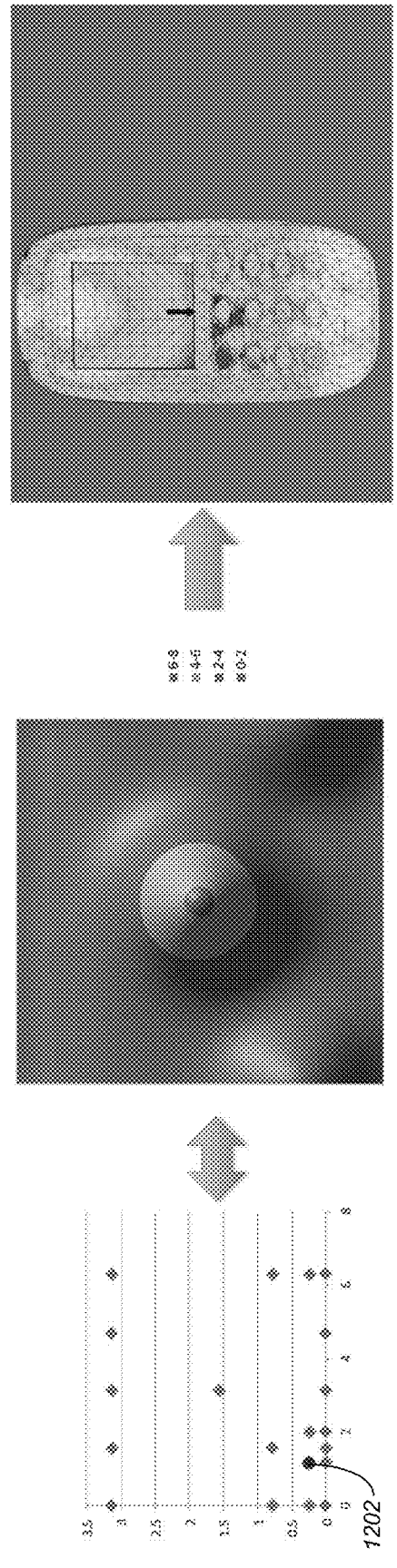

FIGS. 12A and 12B illustrate an additional exemplary evolution of the response surface in accordance with one or more embodiments of the invention. FIGS. 12A and 12B illustrate a continuation of FIG. 11B wherein additional points/orientations are added and the cycle continues until a determination can be made regarding which area is the most likely to receive damage if dropped. Points 1202 are the new points added during each cycle. Once a point/orientation is evaluated, the next cycle does not need to evaluate that point/orientation again. Referring to both FIGS. 11A, 11B, 12A, and 12B, the response surfaces (middle images) show the orientations that cause the maximum damage. Thereafter, the particular orientations are selected for performing a drop test with the results of the drop test illustrated in the images on the far right.

Once a designer receives input/information regarding the most vulnerable areas of their design, the designer can modify the design as desired and the updated model may be analyzed pursuant to the steps outlined above.

Hardware and Software Embodiments

Figure 13:
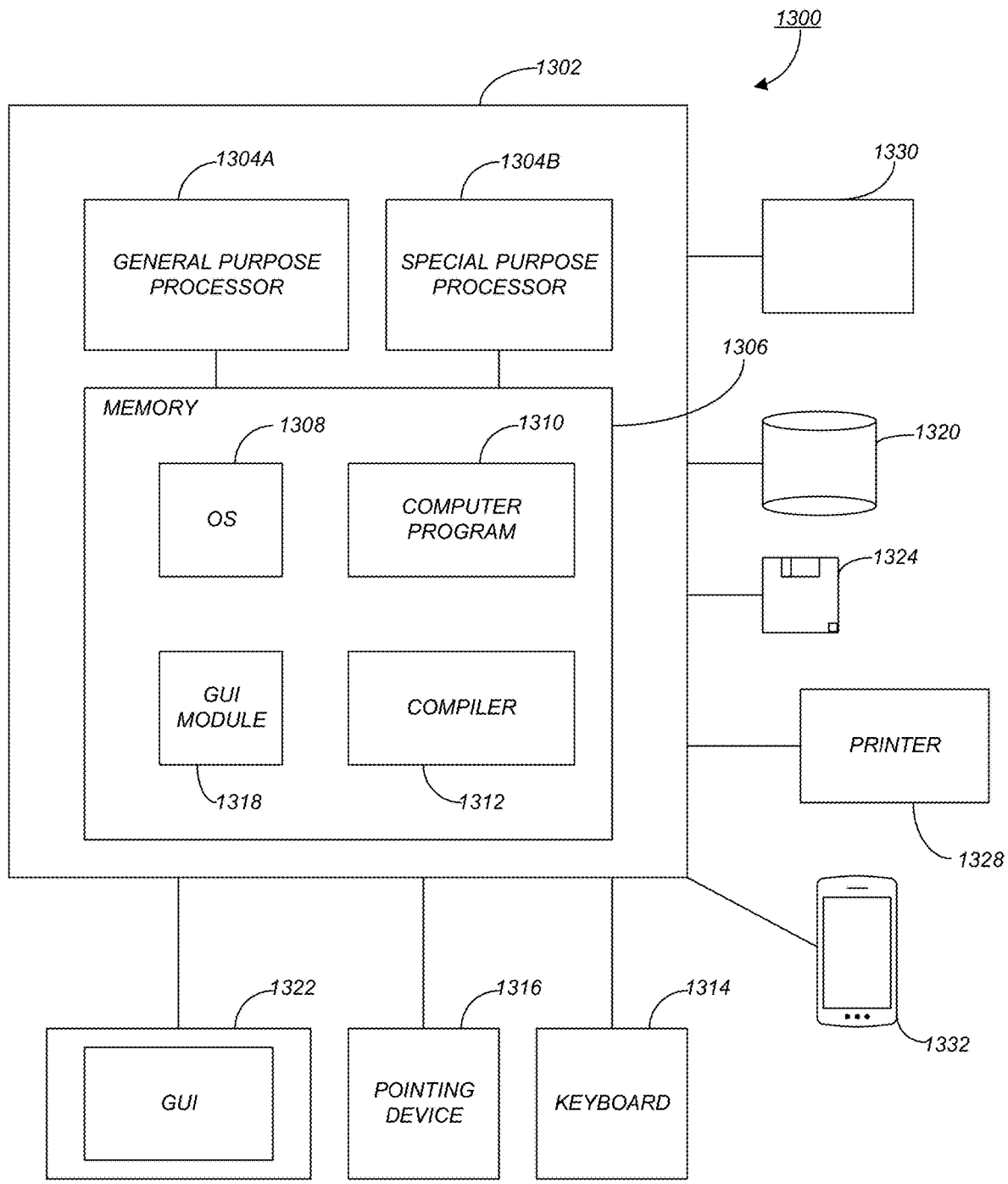
FIG. 13 is an exemplary hardware and software environment used to implement one or more embodiments of the invention.

FIG. 13 is an exemplary hardware and software environment 1300 used to implement one or more embodiments of the invention. The hardware and software environment includes a computer 1302 and may include peripherals. Computer 1302 may be a user/client computer, server computer, or may be a database computer. The computer 1302 comprises a general purpose hardware processor 1304A and/or a special purpose hardware processor 1304B (hereinafter alternatively collectively referred to as processor 1304) and a memory 1306, such as random access memory (RAM). The computer 1302 may be coupled to, and/or integrated with, other devices, including input/output (I/O) devices such as a keyboard 1314, a cursor control device 1316 (e.g., a mouse, a pointing device, pen and tablet, touch screen, multi-touch device, etc.) and a printer 1328. In one or more embodiments, computer 1302 may be coupled to, or may comprise, a portable or media viewing/listening device 1332 (e.g., an MP3 player, IPOD, NOOK, portable digital video player, cellular device, personal digital assistant, etc.). In yet another embodiment, the computer 1302 may comprise a multi-touch device, mobile phone, gaming system, internet enabled television, television set top box, or other internet enabled device executing on various platforms and operating systems.

In one embodiment, the computer 1302 operates by the general purpose processor 1304A performing instructions defined by the computer program 1310 under control of an operating system 1308. The computer program 1310 and/or the operating system 1308 may be stored in the memory 1306 and may interface with the user and/or other devices to accept input and commands and, based on such input and commands and the instructions defined by the computer program 1310 and operating system 1308, to provide output and results.

Output/results may be presented on the display 1322 or provided to another device for presentation or further processing or action. In one embodiment, the display 1322 comprises a liquid crystal display (LCD) having a plurality of separately addressable liquid crystals. Alternatively, the display 1322 may comprise a light emitting diode (LED) display having clusters of red, green and blue diodes driven together to form full-color pixels. Each liquid crystal or pixel of the display 1322 changes to an opaque or translucent state to form a part of the image on the display in response to the data or information generated by the processor 1304 from the application of the instructions of the computer program 1310 and/or operating system 1308 to the input and commands. The image may be provided through a graphical user interface (GUI) module 1318. Although the GUI module 1318 is depicted as a separate module, the instructions performing the GUI functions can be resident or distributed in the operating system 1308, the computer program 1310, or implemented with special purpose memory and processors.

In one or more embodiments, the display 1322 is integrated with/into the computer 1302 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD), portable/handheld game/music/video player/console devices (e.g., IPOD TOUCH, MP3 players, NINTENDO 3DS, PLAYSTATION PORTABLE, etc.), touch tables, and walls (e.g., where an image is projected through acrylic and/or glass, and the image is then backlit with LEDs).

Some or all of the operations performed by the computer 1302 according to the computer program 1310 instructions may be implemented in a special purpose processor 1304B. In this embodiment, the some or all of the computer program 1310 instructions may be implemented via firmware instructions stored in a read only memory (ROM), a programmable read only memory (PROM) or flash memory within the special purpose processor 1304B or in memory 1306. The special purpose processor 1304B may also be hardwired through circuit design to perform some or all of the operations to implement the present invention. Further, the special purpose processor 1304B may be a hybrid processor, which includes dedicated circuitry for performing a subset of functions, and other circuits for performing more general functions such as responding to computer program 1310 instructions. In one embodiment, the special purpose processor 1304B is an application specific integrated circuit (ASIC).

The computer 1302 may also implement a compiler 1312 that allows an application or computer program 1310 written in a programming language such as C, C++, Assembly, SQL, PYTHON, PROLOG, MATLAB, RUBY, RAILS, HASKELL, or other language to be translated into processor 1304 readable code. Alternatively, the compiler 1312 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 1310 accesses and manipulates data accepted from I/O devices and stored in the memory 1306 of the computer 1302 using the relationships and logic that were generated using the compiler 1312.

The computer 1302 also optionally comprises an external communication device such as a modem, satellite link, Ethernet card, or other device for accepting input from, and providing output to, other computers 1302.

In one embodiment, instructions implementing the operating system 1308, the computer program 1310, and the compiler 1312 are tangibly embodied in a non-transitory computer-readable medium, e.g., data storage device 1320, which could include one or more fixed or removable data storage devices, such as a zip drive, floppy disc drive 1324, hard drive, CD-ROM drive, tape drive, etc. Further, the operating system 1308 and the computer program 1310 are comprised of computer program 1310 instructions which, when accessed, read and executed by the computer 1302, cause the computer 1302 to perform the steps necessary to implement and/or use the present invention or to load the program of instructions into a memory 1306, thus creating a special purpose data structure causing the computer 1302 to operate as a specially programmed computer executing the method steps described herein. Computer program 1310 and/or operating instructions may also be tangibly embodied in memory 1306 and/or data communications devices 1330, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 1302.

Figure 14:
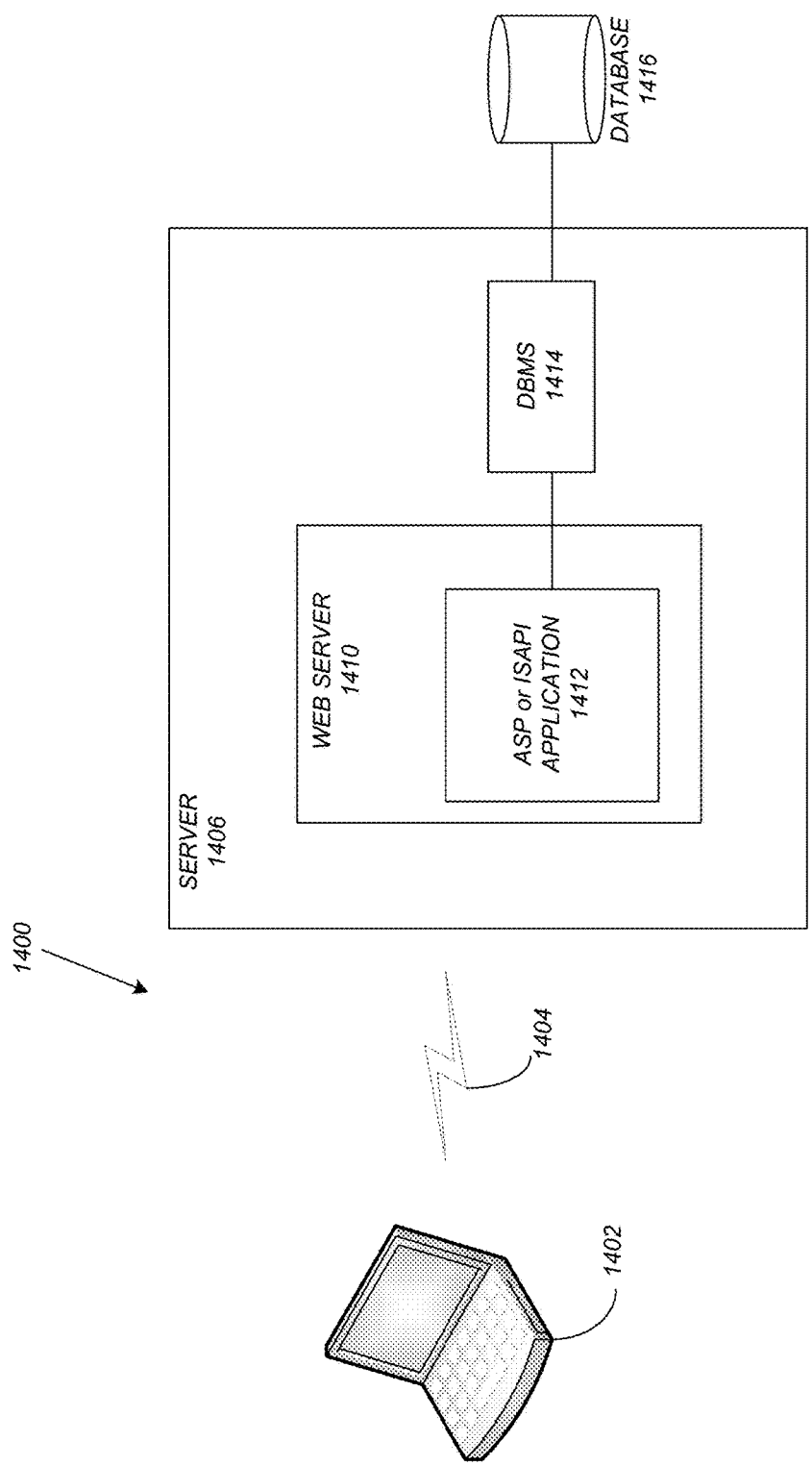
FIG. 14 schematically illustrates a typical distributed/ cloud-based computer system using a network to connect client computers to server computers in accordance with one or more embodiments of the invention.

FIG. 14 schematically illustrates a typical distributed/cloud-based computer system 1400 using a network 1404 to connect client computers 1402 to server computers 1406. A typical combination of resources may include a network 1404 comprising the Internet, LANs (local area networks), WANs (wide area networks), SNA (systems network architecture) networks, or the like, clients 1402 that are personal computers or workstations (as set forth in FIG. 13), and servers 1406 that are personal computers, workstations, minicomputers, or mainframes (as set forth in FIG. 13). However, it may be noted that different networks such as a cellular network (e.g., GSM [global system for mobile communications] or otherwise), a satellite based network, or any other type of network may be used to connect clients 1402 and servers 1406 in accordance with embodiments of the invention.

A network 1404 such as the Internet connects clients 1402 to server computers 1406. Network 1404 may utilize ethernet, coaxial cable, wireless communications, radio frequency (RF), etc. to connect and provide the communication between clients 1402 and servers 1406. Further, in a cloud-based computing system, resources (e.g., storage, processors, applications, memory, infrastructure, etc.) in clients 1402 and server computers 1406 may be shared by clients 1402, server computers 1406, and users across one or more networks. Resources may be shared by multiple users and can be dynamically reallocated per demand. In this regard, cloud computing may be referred to as a model for enabling access to a shared pool of configurable computing resources.

Clients 1402 may execute a client application or web browser and communicate with server computers 1406 executing web servers 1410. Such a web browser is typically a program such as MICROSOFT INTERNET EXPLORER, MOZILLA FIREFOX, OPERA, APPLE SAFARI, GOOGLE CHROME, etc. Further, the software executing on clients 1402 may be downloaded from server computer 1406 to client computers 1402 and installed as a plug-in or ACTIVEX control of a web browser. Accordingly, clients 1402 may utilize ACTIVEX components/component object model (COM) or distributed COM (DCOM) components to provide a user interface on a display of client 1402. The web server 1410 is typically a program such as MICROSOFT'S INTERNET INFORMATION SERVER.

Web server 1410 may host an Active Server Page (ASP) or Internet Server Application Programming Interface (ISAPI) application 1412, which may be executing scripts. The scripts invoke objects that execute business logic (referred to as business objects). The business objects then manipulate data in database 1416 through a database management system (DBMS) 1414. Alternatively, database 1416 may be part of, or connected directly to, client 1402 instead of communicating/obtaining the information from database 1416 across network 1404. When a developer encapsulates the business functionality into objects, the system may be referred to as a component object model (COM) system. Accordingly, the scripts executing on web server 1410 (and/or application 1412) invoke COM objects that implement the business logic. Further, server 1406 may utilize MICROSOFT'S TRANSACTION SERVER (MTS) to access required data stored in database 1416 via an interface such as ADO (Active Data Objects), OLE DB (Object Linking and Embedding DataBase), or ODBC (Open DataBase Connectivity).

Generally, these components 1400-1416 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 1402 and 1406 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 1402 and 1406. In view of the above, embodiments of the invention are implemented as a software application on a client 1402 or server computer 1406. Further, as described above, the client 1402 or server computer 1406 may comprise a thin client device or a portable device that has a multi-touch-based display.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In summary, embodiments of the invention provide a fast and accurate method to predict the worst-case scenario out of all possible orientations when any given object/product is dropped from a certain height. Such capabilities enables fast feedback to a designer, thus helping the designer to design a component that can withstand the impacts due to dropping on the floor. Embodiments of the invention also provides information to the designer on the "vulnerable regions" in the entire model so that the designer can make appropriate design changes inside the design environment. Further, embodiments of the invention enable the designed object/project to be actually physically manufactured in the real world and that is consistent with the design to withstand the various drop test scenarios.

As described above, to provide for the optimization of a drop test and analysis, embodiments of the invention provide a process that receives inputs that include the model geometry, drop height, material properties of the model, and the type of floor. Embodiments then determine the "worst case scenario" for drop orientation that leads to the most structural damage and provides/outputs a Go/No-Go or Pass/Fail or Safe/Not Safe for current designs of the model geometry and choice of material. Such processing enables a designer to make design decisions based on the output thereby shortening the design cycle. In this regard, embodiments of the invention modify a design based on the output and further may build the physical device/model/product that is the subject of the design and drop test. Accordingly, simulation is built into the design cycle without the designer having to maintain a knowledge base regarding details of a problem setup or the physics of the problem/drop tests. Further, embodiments of the invention can be used in conjunction with 3D printed objects that are prone to be dropped in typical daily usage (e.g., cellular phones). In this regard, embodiments of the invention enable designing 3D printed models that are safe in regular operation.

Accordingly, embodiments provide a fast and accurate prediction of the failure of objects when dropped from a certain height and in a given orientation in a CAD model. Such embodiments may include a technique that utilizes a co-rotational formulation for performing nonlinear transient analysis in an efficient manner. Further, embodiments provide a unique methodology for determining the worst case drop scenario. Such a methodology uses a response surface based optimization approach to identify the worst safety factor for a given drop scenario by analyzing various configurations for the orientation of a CAD model in 3D space. Instead of exhaustively analyzing all possible orientations, embodiments optimize the analysis by identifying the worst orientation in a minimal number of configurations for the CAD model orientation. Each configuration of the CAD model is analyzed for failure behavior (e.g., safety factor calculation)(e.g., based on the co-rotational formulation).

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for performing a drop test using a response surface comprising:
   (a) acquire inputs comprising a target safety factor (T-SF), a drop height, and a computer model, wherein the computer model comprises model points MP;
   (b) evaluating on an initial template, wherein:
      (1) the initial template comprises a set of points P in parametric space, wherein the set of points P corresponds to a set of orientations;
      (2) each point P in the set of points in the parametric space corresponds to an orientation of the computer model; and
      (3) the evaluating comprises:
         (i) computing a safety factor at each orientation, in the set of orientations, for each model point MP in the computer model across a set of times (t);
         (ii) for each model point MP, determining a minimum safety factor from the computed safety factors across the set of times (t);
   (c) generating a response surface, for the entire computer model, in the parametric space based on the determined minimum safety factors, wherein:
      (1) the response surface passes through the points P, in the parametric space, and is based on the determined minimum safety factors;
      (2) the generating comprising computing, based on the response surface, a point Pm in the parametric space, having an approximate global minimum safety factor on the response surface, wherein the point Pm has a corresponding orientation;
   (d) generating an actual safety factor SFm comprising evaluating the point Pm by conducting a drop test simulation of the computer model based on the point Pm's corresponding orientation, and the drop height;
   (e) determining whether the actual safety factor SFm is consistent with the target safety factor (T-SF);
   (f) when the actual safety factor SFm is inconsistent with the target safety factor (T-SF), reporting that the computer model has failed the drop test;
   (g) when the actual safety factor SFm is consistent with the target safety factor (T-SF), determining whether the actual safety factor SFm is valid;
   (h) when the actual safety factor SFm is valid, reporting that the computer model has passed the drop test; and
   (i) when the actual safety factor SFm is invalid, adding the point Pm to the set of points and returning to step (c).

2. The computer-implemented method of claim 1, wherein the inputs further comprise one or more material properties of the computer model.

3. The computer-implemented method of claim 1, wherein the inputs further comprise a type of floor.

4. The computer-implemented method of claim 1, wherein the parametric space is defined by a spherical parametrization.

5. The computer-implemented method of claim 1, wherein the response surface is based on a radial basis function:

$$f(x) = \Sigma w_i \Phi(|x - x_i|)$$

where the function $f(x)$ is dependent on radial distance, $x_i$ reflects points with known values, and x consists of any point.

6. The computer-implemented method of claim 5, wherein a kernel for $f(x)$ is selected from a set consisting of:

$$\text{Gaussian: } \Phi(r) = e^{-(\epsilon r)^2};$$
$$\text{Multiquadric } \Phi(r) = \sqrt{\epsilon^2 + r^2}; \text{ and}$$
$$\text{Inverse Multiquadric } \Phi(r) = \frac{1}{\sqrt{\epsilon^2 + r^2}}.$$

7. The computer-implemented method of claim 1, wherein the computing the actual safety factor SFm comprises:
constructing an overlay grid for the response surface;
computing values at each grid point; and
determining a minimum value across all grid points.

8. The computer-implemented method of claim 1, wherein the drop test is based on an equation of motion:

$$M\ddot{x}(t)+C\dot{x}(t)=f_{gr}-f_{int}$$

where M is a system mass, C is a system damping, x(t) represents a position at time t of all model points MP in the computer model as a function of time, $\dot{x}(t)$ represents a velocity at time t of all model points MP in the computer model, $\ddot{x}(t)$ represents an acceleration at time t of all model points MP in the computer model, $f_{gr}$ is a force due to gravity, and $f_{\_int}$ is internal forces.

9. The computer-implemented method of claim 1, wherein the actual safety factor SFm is valid when the actual safety factor SFm is a global minimum safety factor.

10. A system for performing a drop test using a response surface comprising:
(a) a computer;
(b) a drop test analysis application executing on the computer;
(c) inputs, acquired by the drop test analysis application, wherein the inputs comprise a target safety factor (T-SF), a drop height, and a computer model, and wherein the computer model comprises model points MP;
(d) an initial template evaluated by the drop test analysis application, wherein:
(1) the initial template comprises a set of points P in parametric space, wherein the set of points P corresponds to a set of orientations;
(2) each point P in the set of points in the parametric space corresponds to an orientation of the computer model; and
(3) the drop test analysis application evaluates by:
(i) computing a safety factor at each orientation, in the set of orientations, for each model point MP in the computer model across a set of times (t);
(ii) for each model point MP, determining a minimum safety factor from the computed safety factors across the set of times (t);
(e) a response surface, generated by the drop test analysis application, for the entire computer model, in the parametric space based on the determined minimum safety factors, wherein:
(1) the response surface passes through the points P in the parametric space and is based on the determined minimum safety factors;
(2) the response surface is generated by computing, based on the response surface, a point Pm having an approximate global minimum safety factor on the response surface, wherein the point Pm has a corresponding orientation;
(f) an actual safety factor SFm, generated by the drop test analysis application, wherein the SFm is generated by evaluating the point Pm by conducting a drop test simulation of the computer model based on the point Pm's corresponding orientation, and the drop height;
wherein the drop test analysis application further:
(g) determines whether the actual safety factor SFm is consistent with the target safety factor (T-SF);
(h) when the actual safety factor SFm is inconsistent with the target safety factor (T-SF), reports that the computer model has failed the drop test;
(i) when the actual safety factor SFm is consistent with the target safety factor (T-SF), determines whether the actual safety factor SFm is valid;
(j) when the actual safety factor SFm is valid, reports that the computer model has passed the drop test; and
(k) when the actual factor SFm is invalid, adds the point Pm to the set of points and returning to (e) to generate the response surface based on the set of points that includes point Pm.

11. The system of claim 10, wherein the inputs further comprise one or more material properties of the computer model.

12. The system of claim 10, wherein the inputs further comprise a type of floor.

13. The system of claim 10, wherein the parametric space is defined by a spherical parametrization.

14. The system of claim 10, wherein the response surface is based on a radial basis function:

$$f(x)=\Sigma w_i\Phi(|x-x_i|)$$

where the function $f(x)$ is dependent on radial distance, $x_i$ reflects points with known values, and x consists of any point.

15. The system of claim 14, wherein a kernel for $f(x)$ is selected from a set consisting of:

$$\text{Gaussian: } \Phi(r) = e^{-(\epsilon r)^2};$$
$$\text{Multiquadric } \Phi(r) = \sqrt{\epsilon^2 + r^2}; \text{ and}$$
$$\text{Inverse Multiquadric } \Phi(r) = \frac{1}{\sqrt{\epsilon^2 + r^2}}.$$

16. The system of claim 10, wherein the actual safety factor SFm is computed by:
constructing an overlay grid for the response surface;
computing values at each grid point; and
determining a minimum value across all grid points.

17. The system of claim 10, wherein the drop test is based on an equation of motion:

$$M\ddot{x}(t)+C\dot{x}(t)=f_{gr}-f_{int}$$

where M is a system mass, C is a system damping, x(t) represents a position at time t of all model points MP in the computer model as a function of time, $\dot{x}(t)$ represents a velocity at time t of all model points MP in the computer model, $\ddot{x}(t)$ represents an acceleration at time t of all model points MP in the computer model, $f_{gr}$ is a force due to gravity, and $f_{\_int}$ is internal forces.

18. The system of claim 10, wherein the actual safety factor SFm is valid when the actual safety factor SFm is a global minimum safety factor.

* * * * *